(12) United States Patent
Sequeira et al.

(10) Patent No.: US 10,726,221 B2
(45) Date of Patent: Jul. 28, 2020

(54) SYSTEMS AND METHODS FOR DYNAMIC CONTROL OF A SECURITY SYSTEM DEVICE BASED ON TAG INFORMATION

(71) Applicants: Melwyn F. Sequeira, Plantation, FL (US); Hubert A. Patterson, Boca Raton, FL (US); Mohammad Mohiuddin, Boynton Beach, FL (US)

(72) Inventors: Melwyn F. Sequeira, Plantation, FL (US); Hubert A. Patterson, Boca Raton, FL (US); Mohammad Mohiuddin, Boynton Beach, FL (US)

(73) Assignee: SENSORMATIC ELECTRONICS LLC, Boca Raton, FL (US)

( * ) Notice: Subject to any disclaimer, the term of this patent is extended or adjusted under 35 U.S.C. 154(b) by 0 days.

(21) Appl. No.: 16/182,190

(22) Filed: Nov. 6, 2018

(65) Prior Publication Data

US 2019/0073498 A1    Mar. 7, 2019

Related U.S. Application Data

(63) Continuation of application No. 15/805,991, filed on Nov. 7, 2017, now Pat. No. 10,121,032.

(Continued)

(51) Int. Cl.
| | |
|---|---|
| *G06K 7/10* | (2006.01) |
| *G06Q 30/02* | (2012.01) |
| *G06T 11/60* | (2006.01) |
| *G08B 13/24* | (2006.01) |
| *G06Q 10/08* | (2012.01) |
| *G06F 3/0484* | (2013.01) |
| *G06Q 20/20* | (2012.01) |

(52) U.S. Cl.
CPC ....... *G06K 7/10366* (2013.01); *G06Q 10/087* (2013.01); *G06Q 30/0201* (2013.01); *G06Q 30/0202* (2013.01); *G06T 11/60* (2013.01); *G08B 13/248* (2013.01); *G08B 13/2417* (2013.01); *G08B 13/2462* (2013.01); *G06F 3/04842* (2013.01); *G06Q 20/206* (2013.01); *G06Q 30/0205* (2013.01)

(58) Field of Classification Search
CPC .............. G08B 13/2417; G08B 13/248; G08B 13/2462; G06K 7/10366; G06Q 10/087; G06Q 30/0201; G06Q 30/0202; G06Q 30/0205; G06T 11/30
USPC .................................................. 340/539.13
See application file for complete search history.

(56) References Cited

U.S. PATENT DOCUMENTS

| | | |
|---|---|---|
| 6,924,781 B1 | 8/2005 | Gelbman |
| 10,244,064 B2 | 3/2019 | Werner et al. |

(Continued)

*Primary Examiner* — Omar Casillashernandez
(74) *Attorney, Agent, or Firm* — Arent Fox LLP (57) ABSTRACT

Systems and methods for controlling at least one security device based on the behavior of at least one tag. The methods comprise: generating sensor data relating to movement by at least one sensor disposed in a first tag; analyzing the sensor data to determine if an item to which the first tag is coupled is being handled in an unusual, abnormal or nervous manner; determining if an enterprise system has lost communicative contact with the first tag coupled to the item that is being handled in an unusual, abnormal or nervous manner; and causing an operational state of the security device to change in response to the loss of the communicative contact between the enterprise system and the first tag.

20 Claims, 6 Drawing Sheets

Related U.S. Application Data (60) Provisional application No. 62/476,532, filed on Mar. 24, 2017.

(56) References Cited

U.S. PATENT DOCUMENTS

| | | |
|---|---|---|
| 2002/0109593 A1 | 8/2002 | Swartzel et al. |
| 2004/0144842 A1 | 7/2004 | Brignone et al. |
| 2005/0149414 A1 | 7/2005 | Schrodt et al. |
| 2007/0136152 A1* | 6/2007 | Dunsker ............... G06Q 10/08 705/28 |
| 2009/0183403 A1 | 7/2009 | Wright |
| 2011/0099061 A1 | 4/2011 | Giffin et al. |
| 2011/0276382 A1 | 11/2011 | Ramchandani et al. |
| 2011/0289023 A1 | 11/2011 | Forster et al. |
| 2013/0173435 A1 | 7/2013 | Cozad, Jr. |
| 2013/0275261 A1 | 10/2013 | Yoked |
| 2014/0162522 A1 | 6/2014 | Zhou |
| 2014/0210624 A1* | 7/2014 | Wandel ............... E05B 73/0017 340/572.1 |
| 2015/0046237 A1 | 2/2015 | Slonimsky |
| 2015/0262236 A1 | 9/2015 | Cypher et al. |
| 2015/0348384 A1 | 12/2015 | Tam et al. |
| 2016/0042315 A1 | 2/2016 | Field-Darragh et al. |
| 2016/0086191 A1 | 3/2016 | Fonzi et al. |
| 2016/0134930 A1 | 5/2016 | Swafford |
| 2016/0180404 A1 | 6/2016 | Stern et al. |
| 2016/0180672 A1* | 6/2016 | Hoehn ............... G08B 13/2462 340/572.1 |
| 2017/0061525 A1 | 3/2017 | McCoy et al. |
| 2017/0178104 A1 | 6/2017 | Fernandez |
| 2018/0068375 A1 | 3/2018 | Dey et al. |

\* cited by examiner

SYSTEMS AND METHODS FOR DYNAMIC CONTROL OF A SECURITY SYSTEM DEVICE BASED ON TAG INFORMATION

CROSS REFERENCE TO RELATED APPLICATION

The present application is a continuation application of U.S. application Ser. No. 15/805,991, filed on Nov. 7, 2017, now U.S. Pat. No. 10,121,032. The present application also claims priority to U.S. Patent Application Ser. No. 62/476,532 filed on Mar. 24, 2017. The entirety of these application are incorporated herein by reference.

FIELD

This document relates generally to intelligence and security systems (e.g., for retail applications). More particularly, this document relates to implementing systems and methods for the dynamic control of a security system device based on tag information.

BACKGROUND

As digitization of merchandise and Point-Of-Sales ("POS") marketing evolves and the quest to learn more about shopper trends and demographics continues, retailers are looking to gather data streams from an integrated array of sensors and use enterprise or shelf-based analytics to enhance shopper experience.

As an example, RFID is typically used for item level identification. Wireless communications interactions with consumers are achieved via their mobile devices (e.g., using Bluetooth, Near Field Communication ("NFC") and/or WiFi technology). Such wireless communications are being used extensively in retail stores seeking to gain more knowledge about the customer and their shopping trends.

By integrating a plurality of sensors into a smart electronic tag or shelf label, and allowing the customer to interact with the smart electronic label/tag, the customer can obtain much more information about the item they intend to purchase or peruse, while the enterprise gains additional knowledge about their customer.

SUMMARY

The present disclosure concerns implementing systems and methods for controlling at least one security device based on the behavior of at least one tag. The security device includes, but is not limited to, a motion sensor, a door sensor, a door lock, a window sensor, a window lock, a window shade, a security camera, a microphone, a siren, an alarm, or pedestal (e.g., an Electronic Article Surveillance ("EAS") pedestal). The methods comprise: generating sensor data relating to movement by at least one sensor disposed in a first tag; analyzing the sensor data to determine if an item to which the first tag is coupled is being handled in an unusual, abnormal or nervous manner; determining if an enterprise system has lost communicative contact with the first tag coupled to the item that is being handled in an unusual, abnormal or nervous manner; and causing an operational state of the security device to change in response to the loss of the communicative contact between the enterprise system and the first tag. The security device may be located (a) in proximity to the first tag's current location in a facility, (b) along at least one path of travel starting from the first tag's current location and ending at an entryway of the facility, or (c) at the entryway of the facility.

In some scenarios, the analyzing is performed by the first tag's processor and involves comparing a movement pattern defined by the sensor data to each of a plurality of reference movement patterns. Each said reference movement pattern represents a certain type of behavior indicative of a possible theft or unauthorized use of the item to which the first tag is coupled.

In those or other scenarios, the methods further comprise: determining a current location of the first tag in response to a determination that the item is being handled in an unusual, abnormal or nervous manner; and notifying an enterprise system of the first tag's movement and current location so that the security device's operational state can be controlled based thereon. The methods can also involve: identifying at least one second tag that experienced the same or similar behavior within an amount of time prior to when (a) the first tag's movement was detected or (b) the enterprise system's communicative contact was lost with the first tag; and/or performing a notification action. The notification action includes, but is not limited to, logging timestamped information indicating that the first tag and a second tag experienced the same or similar behavior during a given period of time, and/or communicating a notification message to an individual notifying him(her) that at least the first tag experienced and is still experiencing behavior indicative of unauthorized handling of the item to which the first tag is coupled.

DESCRIPTION OF THE DRAWINGS

The present solution will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns implementing systems and methods for dynamically controlling one or more security system devices based on behavior of tag(s). The methods generally involve: detecting unusual, abnormal or nervous handling of an item to which a tag is coupled; detecting a current location of the tag in a facility; determining if an enterprise system currently has communicative contact with the tag; detect an occurrence of a trigger event based on (1) the detected unusual, abnormal or nervous handling of the item, (2) the tag's current location within the facility and/or (3) a current state of the communicative contact between the tag and the enterprise system; and controlling the security device in response to the detected trigger event occurrence. The controlling can cause the security system device to transition operational states (e.g., from a sleep state to an audio and/or video capture state, or from an unlocked state to a locked state), change a pointing direction (e.g., via camera panning), change a pointing angle, and/or change a zoom level.

Figure 1:
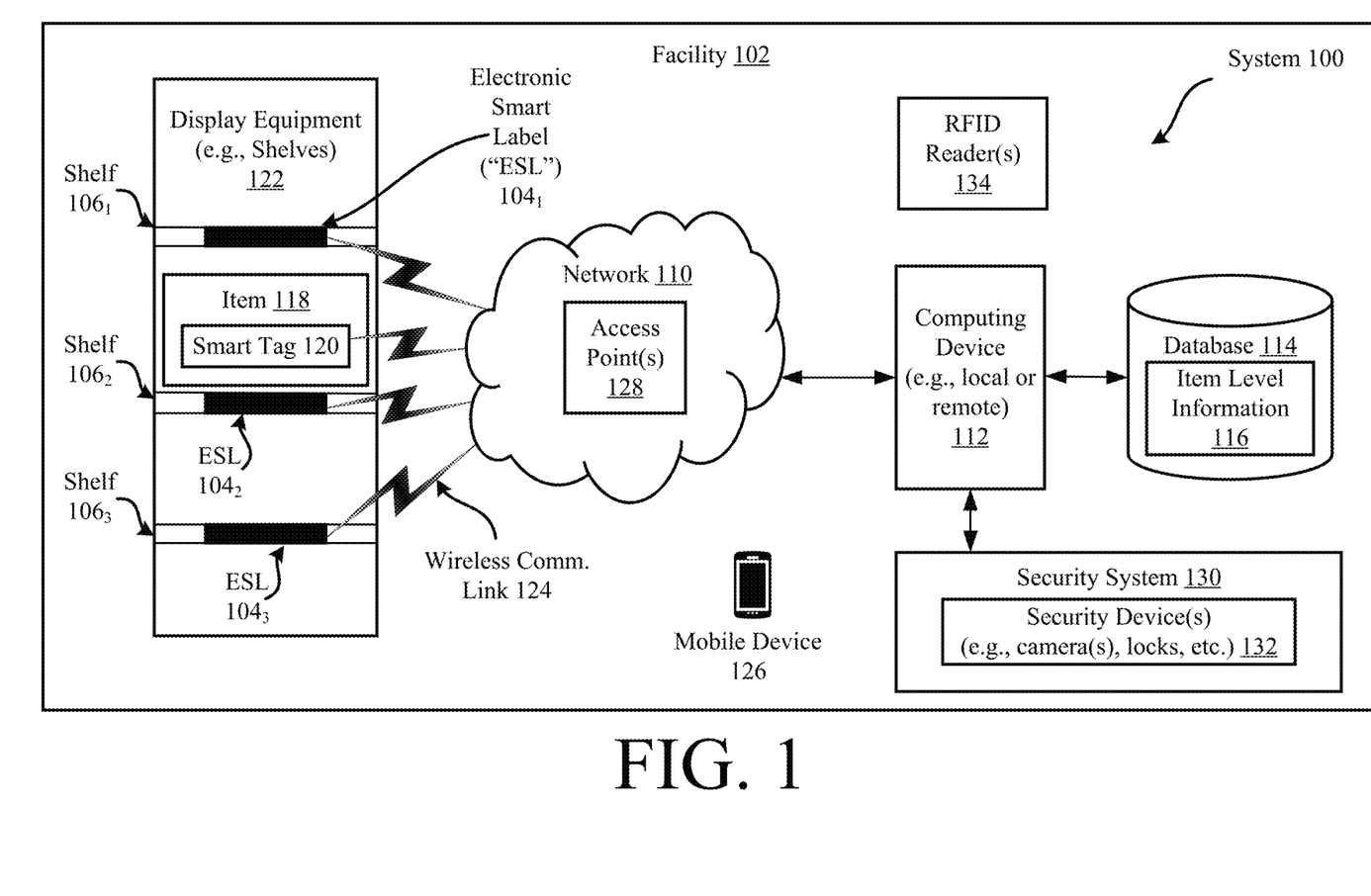
FIG. 1 is an illustration of an illustrative system.

Referring now to FIG. 1, there is provided an illustration of an illustrative system 100. System 100 is entirely or at least partially disposed within a facility 102. The facility 102 can include, but is not limited to, a manufacturer's facility, a distribution center facility, a retail store facility or other facility within a supply chain.

As shown in FIG. 1, at least one item 118 resides within the facility 102. The item 118 has an EST 120 coupled thereto. This coupling is achieved via an adhesive (e.g., glue), a mechanical coupler (e.g., straps, clamps, snaps, etc.), a weld, chemical bond or other means. The EST 120 is generally configured to provide a visual and/or auditory output of item level information. The item level information includes, but is not limited to, an item description, item nutritional information, a promotional message, an item regular price, an item sale price, a currency symbol, and/or a source of the item. The EST 120 will be described in detail below in relation to FIGS. 2-4. The item level information can be output in a format selected from a plurality of formats based on a geographic location of the item, a date, and/or an item pricing status (e.g., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selection parameter.

The item 118 is disposed on display equipment 122. The display equipment includes, but is not limited to, shelves $106_1$-$106_3$, display cabinets, and/or exhibit cases. In the shelf scenario, each shelf $106_1$-$106_3$ may have an Electronic Smart Label ("ESL") affixed thereto. ESLs are well known in the art, and therefore will not be described herein. Still, it should be understood that the ESLs display information relating to the items stored on the respective shelves. In some scenarios, the ESLs are connected to a corporate network via long-range radio technology. In this case, the ESLs may communicate with the ESTs via a short-range or long-range radio and provide informational updates thereto.

The EST 120 and ESLs $104_1$-$104_3$ comprise wireless communication components that enable the communication of item level information thereto and/or therefrom. The wireless communication components can implement one or more different types of communication technology. The communication technologies can include, but are not limited to, Radio Frequency ("RF") communication technology; Bluetooth technology; WiFi technology; beacon technology; and/or LiFi technology. Each of the listed types of communication technology are well known in the art, and therefore will not be described herein.

The item level information is provided to the EST and ESLs from a computing device 112 via a network 110. The computing device 112 can be local to the facility 102 as shown in FIG. 1 or remote from the facility 102. The computing device 112 will be described in detail below in relation to FIG. 5. However, at this time, it should be understood that the computing device 112 is configured to: write data to and read data from a database 114, EST 120 and/or ESLs $104_1$-$104_3$; and/or perform language and currency conversion operations using item level information obtained from the database 114, EST 120 and/or ESLs $104_1$-$104_3$. The data can include, but is not limited to, item level information 116.

Accordingly, the computing device 112 facilitates updates to the item level information output from the ESTs and ESLs. Such information updating can be performed periodically, in response to instructions received from an associate (e.g., a retail store employee), and/or in response to a detected change in the item level information 116. For example, if a certain product is placed on sale, then the sale price for that product is transmitted to access point 128, which in turn transmits the sale price to each EST/ESL associated with that product. The sale price is then output from the ESTs/ESLs. The present solution is not limited to the particulars of this example.

The network 110 interconnects the computing device 112 with at least one access point 128. Network 110 can be a wired or wireless network facilitating communication between computing device 112 and the access point 128. The access point 128 receives the item level information 116 from the computing device 112, optionally translates this information, and sends it to the EST 120 and/or ESLs 104₁-104₃ via wireless communication links 124.

Although a single computing device 112 is shown in FIG. 1, the present solution is not limited in this regard. It is contemplated that more than one computing device can be implemented. Also, the present solution is not limited to the illustrative system architecture described in relation to FIG. 1. For example in other scenarios, the present solution is used in a system such as that disclosed in U.S. Patent Publication No. 2012/0326849 to Relihan et al. (incorporated herein by reference).

System 100 also comprises a security system 130. The security system 130 is generally configured to detect intrusion and/or unauthorized activities in and around the facility 102 (e.g., theft of item 118). In this regard, security system 130 comprises one or more security devices 132. The security devices 132 include, but are not limited to, motion sensors (interior and/or exterior), door sensors, door locks (e.g., remotely controlled), window sensors, window locks (e.g., remotely controlled), window shades (e.g., remotely controlled), security cameras (e.g., still image cameras and/or video cameras), microphones, sirens, alarms, and/or pedestal.

During operations of system 100, the security devices 132 are dynamically controlled based on information about the smart tag 120. This tag information includes, but is not limited to, tag location, tag motion, tag movement, and/or a state of a communicative contact between the tag and an external device (e.g., access point 128 and/or computing device 112). Accordingly, smart tag 120 comprises one or more sensors to detect its current location, detect any motion or movement thereof, detect an amount of light in a surrounding environment, and/or detect an amount of fluid in a surrounding environment. The sensors include, but are not limited to, an Inertial Measurement Unit ("IMU"), a vibration sensor, an accelerometer, a gyroscope, a light sensor, a fluid/liquid/moisture sensor, a proximity sensor, and/or a beacon communications device.

The smart tag 120 is configured to analyze sensor data to determine if its location, motion and/or movement indicates unusual, abnormal or nervous handling of the item 118. The unusual, abnormal or nervous handling of the item 118 can involve (for example) hiding the item 118 in a pocket, bag or other object in which (1) light is blocked from reaching the sensor(s) and/or (2) the tag's communicative interaction with external devices (e.g., access point 128, mobile device 126, or other communications device (e.g., a beacon)) is blocked.

The security device 130 is controlled by: detecting unusual, abnormal or nervous handling of the item 118; detecting a current location of the smart tag 120 in the facility 102; determining if an enterprise system (e.g., computing device 112 and/or access point 128) currently has communicative contact with the tag; detect an occurrence of a trigger event based on (1) the detected unusual, abnormal or nervous handling of the item, (2) the tag's current location within the facility and/or (3) a current state of the communicative contact between the tag and the enterprise system; and controlling the security device 130 in response to the detected trigger event occurrence. The controlling can cause the security system device to transition operational states (e.g., from a sleep state to an audio and/or video capture state, or from an unlocked state to a locked state), change a pointing direction (e.g., via camera panning), change a pointing angle, and/or change a zoom level.

In some scenarios, the smart tag 120 detects when the item 118 is being handled. In response to this detection, the smart tag 120 can analyze sensor data to determine if the smart tag's motion/movement indicates that the item is being handled in an unusual, abnormal or nervous manner. Pre-defined motion patterns can be used to make this determination. For example, a motion/movement patterns specified by sensor data collected over a given time window can be compared to each pre-defined motion pattern to determine if a match exists therebetween (e.g., by a certain degree). The present solution is not limited to the particulars of this example. In other scenarios, the sensor data can be communicated to and analyzed by computing device 112, rather than by the smart tag 120.

The smart tag 120 then notifies the computing device 112 that it is currently being handled in an unusual, abnormal or nervous manner. In turn, the computing device 112 starts a timer, and monitors its ability to communicate with the smart tag 120. The timer is stopped when the computing device 112 is no longer able to communicate with the smart tag 120 (e.g., when the smart tag 120 has been placed in a shielded bag). If this time exceeds a threshold value, then the computing device 112 determines if any other smart tags in the facility exhibit the same behavior during a window of time immediately before, immediately after, and/or inclusive of the time at which the computing device's interaction with the smart tag 120 was lost. If at least one other smart tag exhibited or is exhibiting similar behavior, then the computing device takes at least one security action. The security action can include, but is not limited to: sending a command to the security system 130 to control operations thereof (e.g., capture a video of an area in which the tag was last known to be present, and/or capture a video of all persons leaving the facility 102); and/or sending a message to an employee's mobile device 126 informing him(her) of a possible unauthorized or suspicious handling of the item.

Figure 2:
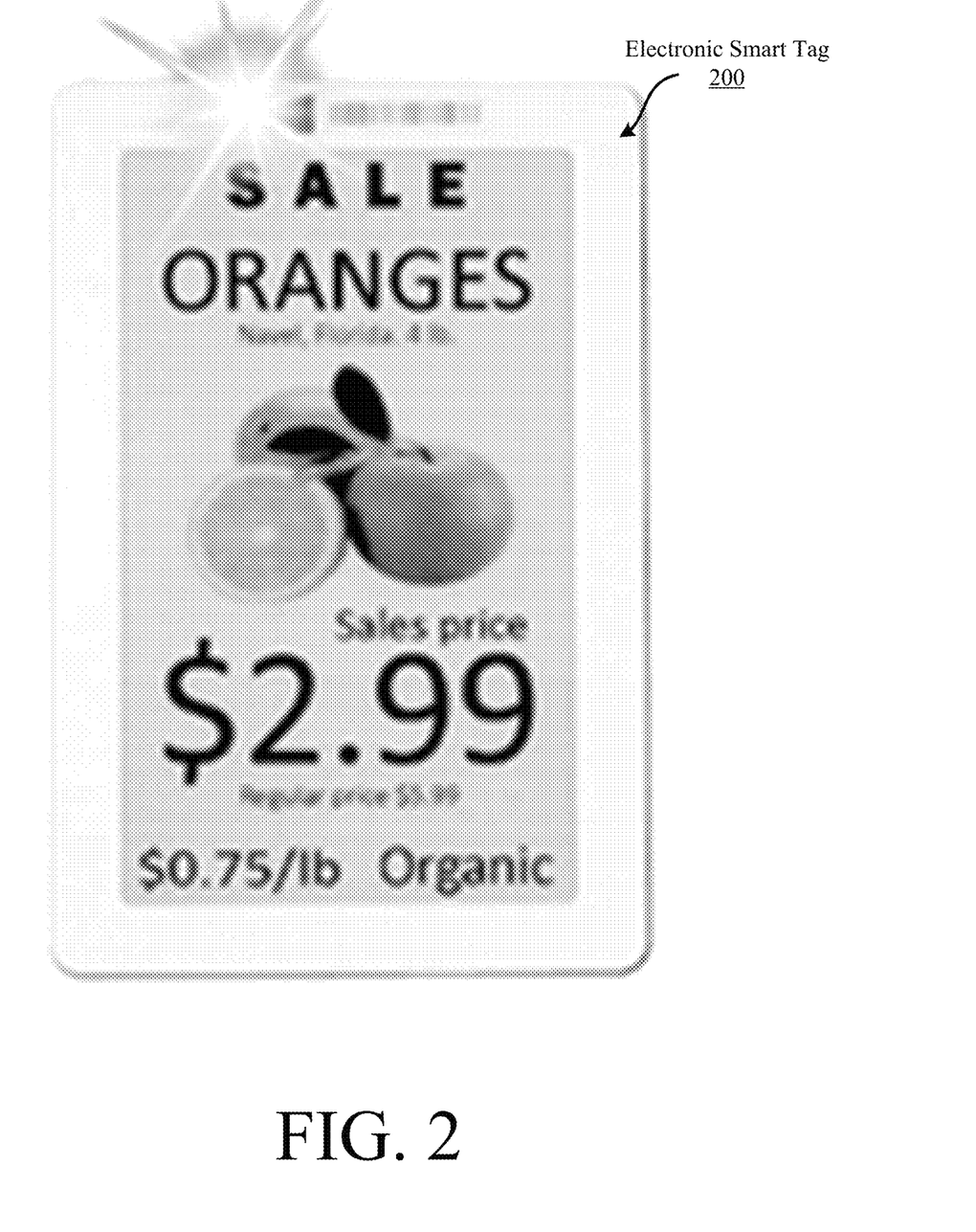
FIG. 2 is an illustration of an exemplary Electronic Smart Tag ("EST").

Referring now to FIG. 2, there is an illustration of an exemplary EST 200 displaying item level information. An exemplary architecture for the EST 200 is provided in FIGS. 3-4. EST 120 and/or ESLs 104₁-104₃ of FIG. 1 is/are the same as or substantially similar to EST 200. As such, the discussion of EST 200 is sufficient for understanding the EST 120 and/or ESLs 104₁-104₃ of FIG. 1.

Figure 3:
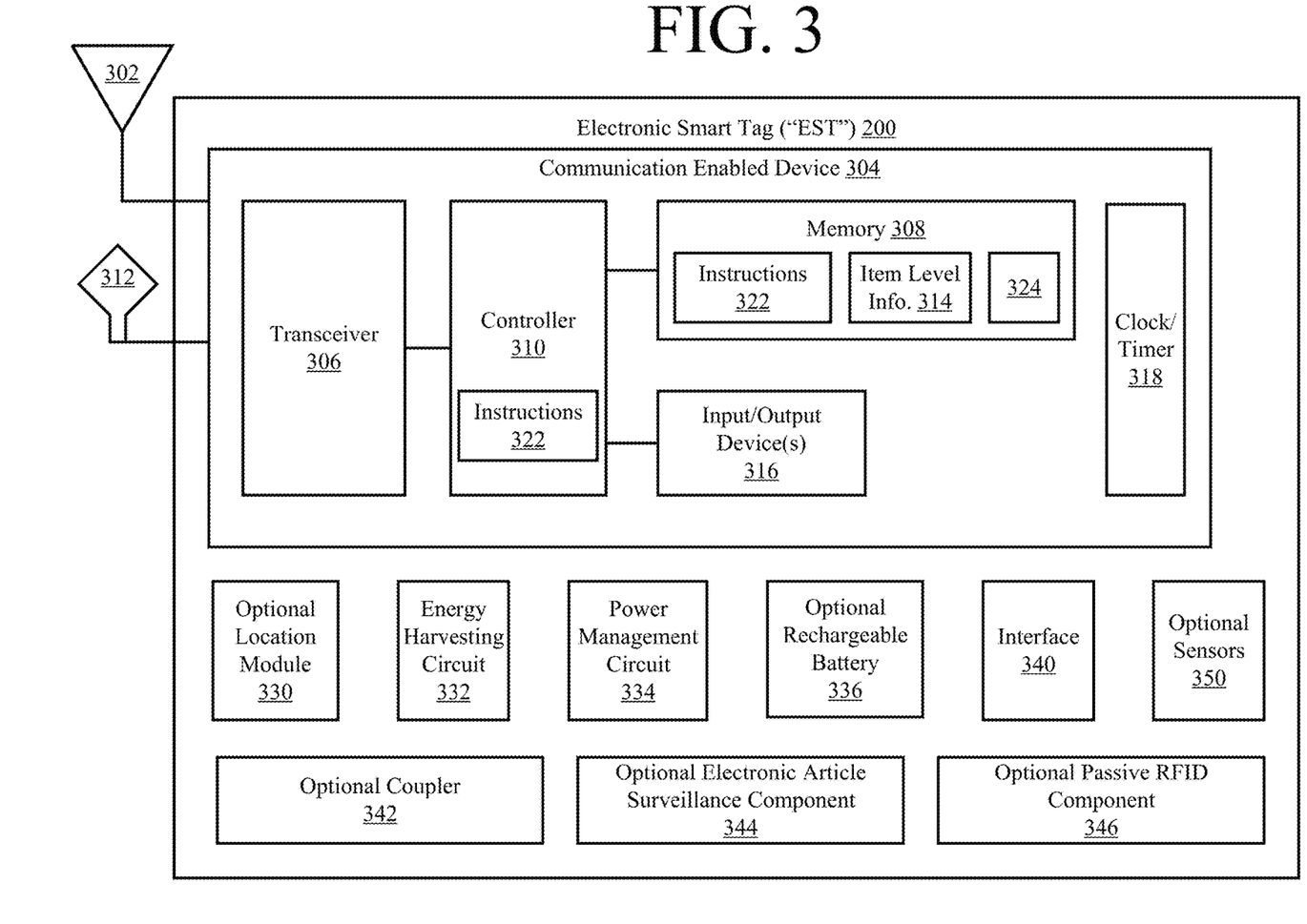
FIG. 3 is a block diagram of an illustrative architecture for the EST of FIG. 2.

The EST 200 can include more or less components than that shown in FIG. 3. However, the components shown are sufficient to disclose an illustrative embodiment implementing the present solution. Some or all of the components of the EST 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative EST 200 configured to facilitate improved inventory management and security. In this regard, the EST 200 is configured for allowing data to be exchanged with an external device (e.g., computing device 112 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; Sub-GHz technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 306-318 shown in FIG. 3 may be collectively referred to herein as a communication enabled device 304, and include a memory 308 and a clock/timer 318. Memory 308 may be a volatile memory and/or a non-volatile memory. For example, the memory 308 can include, but is not limited to, Random Access Memory ("RAM"), Dynamic RAM ("DRAM"), Static RAM ("SRAM"), Read Only Memory ("ROM") and flash memory. The memory 308 may also comprise unsecure memory and/or secure memory.

In some scenarios, the communication enabled device 304 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 308. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed EST 200. The update of the firmware, in case of issues, can also be performed remotely.

As shown in FIG. 3, the communication enabled device 304 comprises at least one antenna 302, 312 for allowing data to be exchanged with the external device via a wireless communication technology (e.g., an RFID technology, an NFC technology and/or a SRC technology). The antenna 302, 312 is configured to receive signals from the external device and/or transmit signals generated by the communication enabled device 304. In some scenarios, the antenna 302, 312 comprises a near-field or far-field antenna. The antennas includes, but are not limited to, a chip antenna or a loop antenna.

The communication enabled device 304 also comprises a transceiver 306. Transceivers are well known in the art, and therefore will not be described herein. However, it should be understood that the transceiver 306 generates and transmits signals (e.g., RF carrier signals) to external devices, as well as receives signals (e.g., RF signals) transmitted from external devices. In this way, the communication enabled device 304 facilitates the registration, identification, location and/or tracking of an item (e.g., item 118 of FIG. 1) to which the EST 200 is coupled. The communication enabled device 304 also facilitates the automatic and dynamic modification of item level information that is being or is to be output from the EST 200 in response to certain trigger events. The trigger events can include, but are not limited to, the EST's arrival at a particular facility (e.g., facility 102 of FIG. 1), the EST's arrival in a particular country or geographic region, a date occurrence, a time occurrence, a price change, and/or the reception of user instructions.

Item level information 314 and/or other information 324 associated with the identification, location and/or motion/movement of the EST 200 can be stored in memory 308 of the communication enabled device 304 and/or communicated to other external devices (e.g., computing device 112 of FIG. 1) via transceiver 306 and/or interface 340 (e.g., an Internet Protocol or cellular network interface). For example, the communication enabled device 304 can communicate information specifying a timestamp, a unique identifier, item description, item price, a currency symbol and/or location information to an external computing device. The external computing device (e.g., server) can then store the information in a database (e.g., database 114 of FIG. 1) and/or use the information during language and/or currency conversion operations.

The communication enabled device 304 also comprises a controller 310 and input/output devices 316. The controller 310 can also execute instructions 322 implementing methods for facilitating item inventorying and/or security. In this regard, the controller 310 includes a processor (or logic circuitry that responds to instructions) and the memory 308 includes a computer-readable storage medium on which is stored one or more sets of instructions 322 (e.g., software code) configured to implement one or more of the methodologies, procedures, or functions described herein. The instructions 322 can also reside, completely or at least partially, within the controller 310 during execution thereof by the EST 200. The memory 308 and the controller 310 also can constitute machine-readable media. The term "machine-readable media", as used here, refers to a single medium or multiple media (e.g., a centralized or distributed database, and/or associated caches and servers) that store the one or more sets of instructions 322. The term "machine-readable media", as used here, also refers to any medium that is capable of storing, encoding or carrying a set of instructions 322 for execution by the EST 200 and that cause the EST 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the EST 200 and/or for notifying the person of a particular pricing status (e.g., on sale status) of the item to which the EST is coupled.

The clock/timer 318 is configured to determine a date, a time, and/or an expiration of a pre-defined period of time. Technique for determining these listed items are well known in the art, and therefore will not be described herein. Any known or to be known technique for determining these listed items can be used herein without limitation.

The EST 200 also comprises an optional location module 330. The location module 330 is generally configured to determine the geographic location of the EST at any given time. For example, in some scenarios, the location module 330 employs Global Positioning System ("GPS") technology and/or Internet based local time acquisition technology. The present solution is not limited to the particulars of this example. Any known or to be known technique for determining a geographic location can be used herein without limitation.

The optional coupler 342 is provided to securely or removably couple the EST 200 to an item (e.g., item 118 of FIG. 1). The coupler 342 includes, but is not limited to, a mechanical coupling means (e.g., a strap, clip, clamp, snap)

and/or adhesive (e.g., glue or sticker). The coupler 342 is optional since the coupling can be achieved via a weld and/or chemical bond.

The EST 200 can also include an optional rechargeable battery 336, an optional Electronic Article Surveillance ("EAS") component 344, and/or an operational passive/active/semi-passive RFID component 346. Each of the listed optional components 336, 344, 346 is well known in the art, and therefore will not be described herein. Any known or to be known battery, EAS component and/or RFID component can be used herein without limitation.

As shown in FIG. 2, the EST 200 further comprises an energy harvesting circuit 332 and a power management circuit 334 for ensuring continuous operation of the EST 200 without the need to change a battery. In some scenarios, the energy harvesting circuit 302 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy.

The energy harvesting circuit 332 can operate in two (2) ways. First, the energy harvesting circuit 332 can harvest energy from an available source while online (i.e., when the EST 200 is attached to merchandise). Second, the energy harvesting circuit 332 can harvest energy while offline (i.e., when the EST 200 is detached from merchandise) via a charging station/bin. This ensures that the EST 200 is fully charged when the EST is ready to be deployed or go online.

The energy harvesting circuit 332 can also be supplemented with bigger harvesters and/or a mains power source. In this case, the energy harvesting circuit 332 can be placed closer to its primary source (e.g., a solar panel on top of a shelf) and power from there can be distributed over two (2) wires. The design allows multiple labels to be connected to a single harvester circuit. The harvester circuit can be replaces with the mains power source.

The EST 200 may also include optional sensors 350 employing environmental and proximity sensing technology. The sensors 350 can include, but are not limited to, a light sensor, a fluid/liquid/humidity sensor, an IR detector, a camera, and/or an RF detection unit. The input/output devices 316 (e.g., the display) can be turned off when a person is not located in proximity thereto. This capability is useful when the input/output devices 316 (e.g., the display) is not considered low power.

The power management circuit 334 is generally configured to control the supply of power to components of the EST 200. In the event all of the storage and harvesting resources deplete to a point where the EST 200 is about to enter a shutdown/brownout state, the power management circuit 334 can cause an alert to be sent from the EST 200 to a remote device (e.g., computing device 112 of FIG. 1). In response to the alert, the remote device can inform an associate (e.g., a store employee) so that (s)he can investigate why the EST 200 is not recharging and/or holding charge.

The power management circuit 334 is also capable of redirecting an energy source to the EST's 200 electronics based on the energy source's status. For example, if harvested energy is sufficient to run the EST's 200 function, the power management circuit 334 confirms that all of the EST's 200 storage sources are fully charged such that the EST's 200 electronic components can be run directly from the harvested energy. This ensures that the EST 200 always has stored energy in case harvesting source(s) disappear or lesser energy is harvested for reasons such as drop in RF, light or vibration power levels. If a sudden drop in any of the energy sources is detected, the power management circuit 334 can cause an alert condition to be sent from the EST 200 to the remote device (e.g., computing device 112 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

Figure 4:
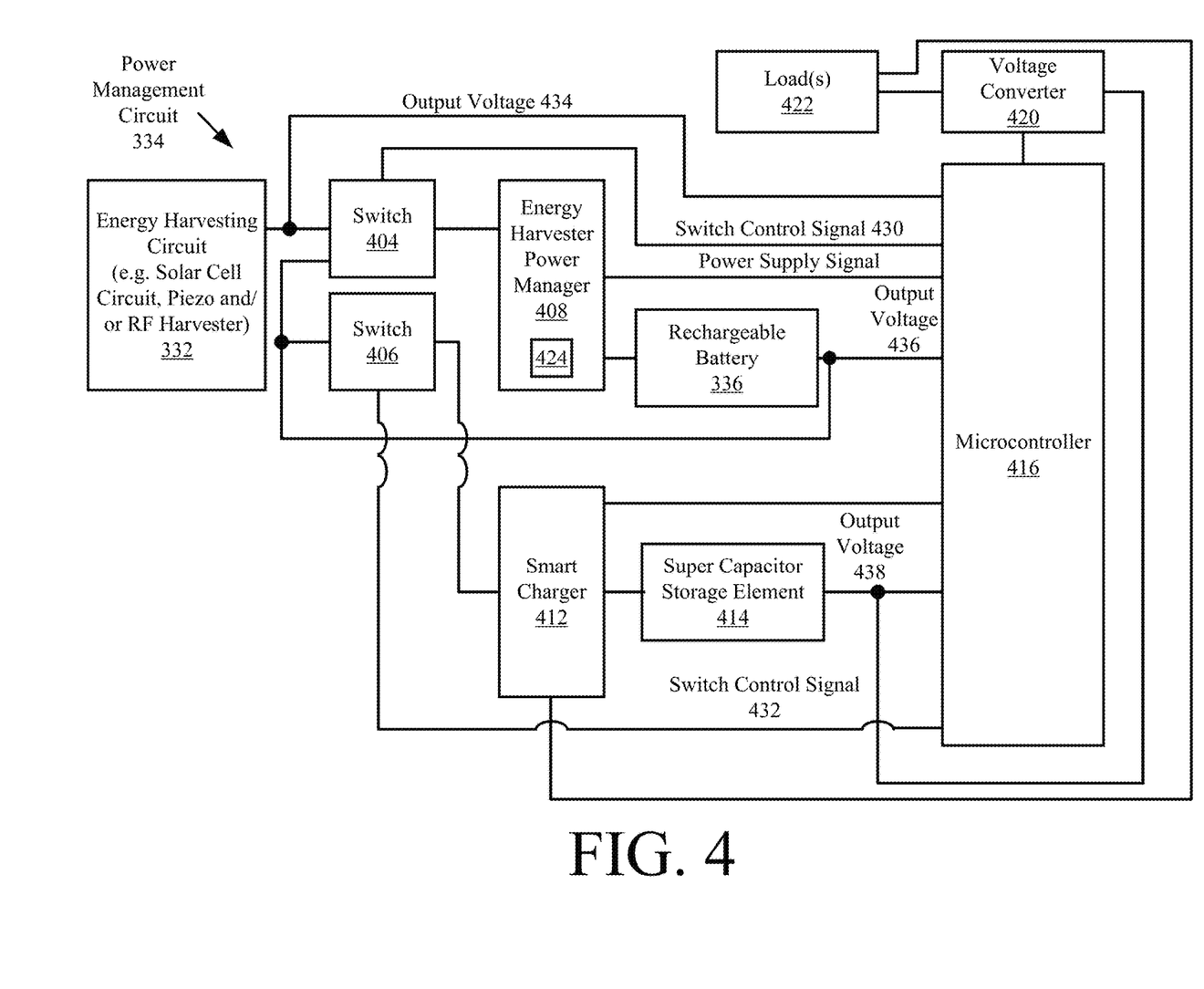
FIG. 4 is a block diagram of an illustrative architecture for a power management circuit of the EST of FIGS. 2-3.

Referring now to FIG. 4, there is provided a block diagram of an exemplary architecture 400 for the power management circuit 334 of the EST 200. The power management circuit 334 is not limited to the particular architecture shown in FIG. 4. In this regard, it should be understood that that power management circuit 334 can include more or less components than that shown in FIG. 4.

The power management circuit 334 is configured to provide a way in which the EST 200 is: deployable as a plug-n-play energy harvested wireless sensor that is ready to function as soon as it is turned on; and a self-sustaining sensor system wherein its power source would virtually never need to be replaced. In this regard, the power management circuit 334 is electrically connected to the energy harvesting circuit 332 and the optional rechargeable battery 336. The power management circuit 334 comprises switches 404, 406, an Energy Harvester Power Manager ("EHPM") 408, a Super Capacitor ("SC") storage element 414, a smart charger 412 for the SC storage element, a microcontroller 416, and a DC-DC voltage converter 420 electrically connected to a load(s) 422. The microcontroller 416 can be the same as or separate/distinct from the controller 310 of FIG. 3. The load 422 can include, but is not limited to, components 304, 330, 340, 350, 344 and/or 346 of FIG. 3.

In some scenarios, the energy harvesting circuit 332 comprises a solar cell circuit. The present solution is not limited in this regard. Other types of energy harvesting circuits can be used herein that generate a relatively low amount of output power.

At initial power up of the EST 200, the SC storage element 414 is assumed to be in a completely discharged state. Thus, the initial charge of the SC storage element 414 is at a level of approximately or substantially equal to zero volts. However, the rechargeable battery 336 is in a quasi-discharged state in which its initial charge is at a level greater than zero volts (e.g., 3 volts). As such, the rechargeable battery 336 has a sufficient amount of initial stored energy to nearly instantaneously enable operations of the control electronics of the EST 200. In this regard, an output voltage 436 is supplied from the rechargeable battery 336 to the EHPM 408 via switch 404, whereby operations of boost converters 424 contained in the EHPM 408 are started immediately after turning on the EST 200. The output voltage 436 is also supplied from the rechargeable battery 336 to the microcontroller 416 via the EHPM 408.

The available power from rechargeable battery is also used at this time to charge the SC storage element 414. In this regard, the output voltage 436 of the rechargeable battery 336 is supplied to the SC storage element 414 via switch 406 and smart charger 412, whereby charging of the SC storage element is expedited. An output voltage 438 of the SC storage element is supplied to the load(s) 422 via the voltage converter 420. The EST 200 is considered fully operational when the output voltage 438 reaches a level (e.g., 3.8 V) that is sufficient to cause the load(s) to perform the intended operations thereof.

Throughout operation of the EST 200, the microcontroller 416 monitors the output voltage 434 of the solar cell circuit 402, as well as the output voltage 436 of the rechargeable battery and the output voltage 438 of the SC storage element 414. Once the output voltage 438 of the SC storage element 414 reaches a desired voltage (e.g., 3.8 V) after system activation (or powering on), the microcontroller 416 enables a timer to time the charging of the SC storage element 414. After a pre-determined time period (e.g., 6 hours), an assumption is made that the SC storage element 414 has reached its leakage current equilibrium, and therefore no longer needs to be charged. In effect, the microcontroller 416 may optionally perform operations at this time to terminate the supply of output voltage 436 to the SC storage element 414 via switch 406 and smart charger 412.

When the output voltage 438 of the SC storage element 414 falls below a threshold value (e.g., 3.3 V), the microcontroller 416 communicates a switch control signal 432 to switch 406 so as cause the output voltage 436 of the rechargeable battery 410 to once again be supplied to the SC storage element 414 via the smart charger 412. Output voltage 436 is supplied to the SC storage element 414 until the output voltage 438 thereof exceeds an upper threshold value. In effect, the SC storage element 414 is recharged whereby the energy expended while driving load(s) 422 is(are) restored.

When the solar cell circuit 402 is active, the output voltage 434 of the solar cell circuit 402 is supplied to the rechargeable battery 336 via EHPM 408. In effect, the rechargeable battery 336 is recharged by the solar cell circuit 402, whereby the energy expended in charging and re-charging the SC storage element 414 is restored while the EST 200 is maintained in its fully operational state.

The above described process of using the rechargeable battery 336 to charge the SC storage element 414 is repeated as needed. Thus, the above described EST 200 performs self-monitoring and charges its respective re-chargeable elements throughout its entire operation.

Figure 5:
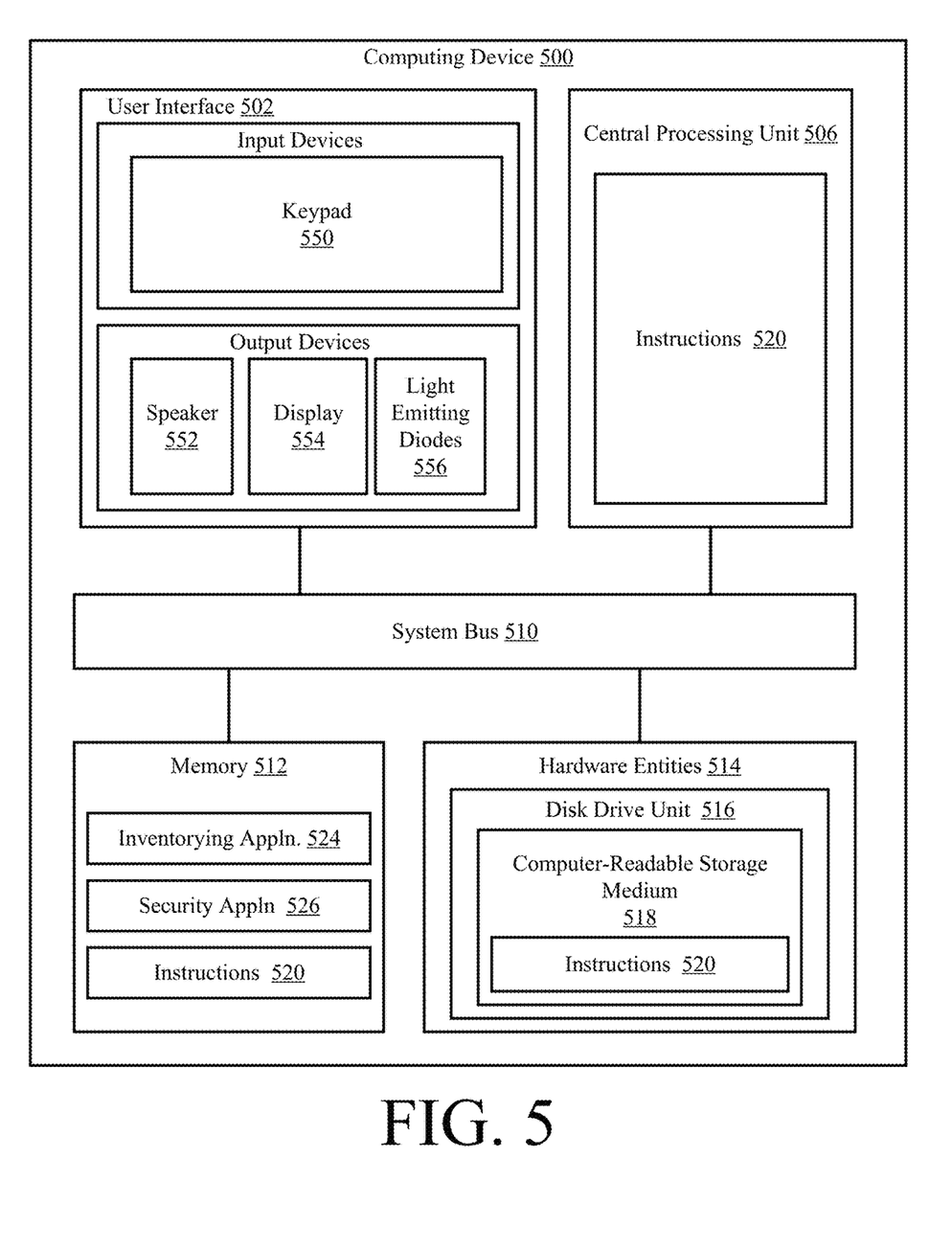
FIG. 5 is a block diagram of an illustrative architecture for a computing device.

Referring now to FIG. 5, there is provided a detailed block diagram of an exemplary architecture for a computing device 500. Computing device 112 of FIG. 1 is the same as or substantially similar to computing device 500. As such, the following discussion of computing device 500 is sufficient for understanding computing device 112.

Computing device 500 may include more or less components than those shown in FIG. 5. However, the components shown are sufficient to disclose an illustrative embodiment implementing the present solution. The hardware architecture of FIG. 5 represents one embodiment of a representative Computing device configured to facilitate improved inventory pricing management. As such, the computing device 500 of FIG. 5 implements at least a portion of a method for automatically and dynamically modifying item level information output from ESTs and/or ESLs in accordance with the present solution.

Some or all the components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices (e.g., a keypad 550) and output devices (e.g., speaker 552, a display 554, and/or light emitting diodes 556), which facilitate user-software interactions for controlling operations of the computing device 500.

At least some of the hardware entities 514 perform actions involving access to and use of memory 512, which can be a RAM, a disk driver and/or a Compact Disc Read Only Memory ("CD-ROM"). Hardware entities 514 can include a disk drive unit 516 comprising a computer-readable storage medium 518 on which is stored one or more sets of instructions 320 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 320 for execution by the computing device 500 and that cause the computing device 500 to perform any one or more of the methodologies of the present disclosure.

In some scenarios, the hardware entities 514 include an electronic circuit (e.g., a processor) programmed for facilitating item inventorying and/or security. In this regard, it should be understood that the electronic circuit can access and run an inventorying application 524 and a security application 526 installed on the computing device 500. The software application 524 is generally operative to: obtain item level information and/or other information from ESTs and/or ESLs; program item level information onto ESTs and/or ESLs; convert the language, pricing and/or currency symbol of item level information; facilitate registration of ESTs and/or ESLs with inventory systems; and/or determine when security related actions need to be taken based on smart tag information. The software application 524 is generally operative to control one or more security devices (e.g., security device(s) 132 of FIG. 1) in response to smart tag operational states, locations and motion/movement. Other functions of the software application 524 will become apparent as the discussion progresses.

Figure 6:
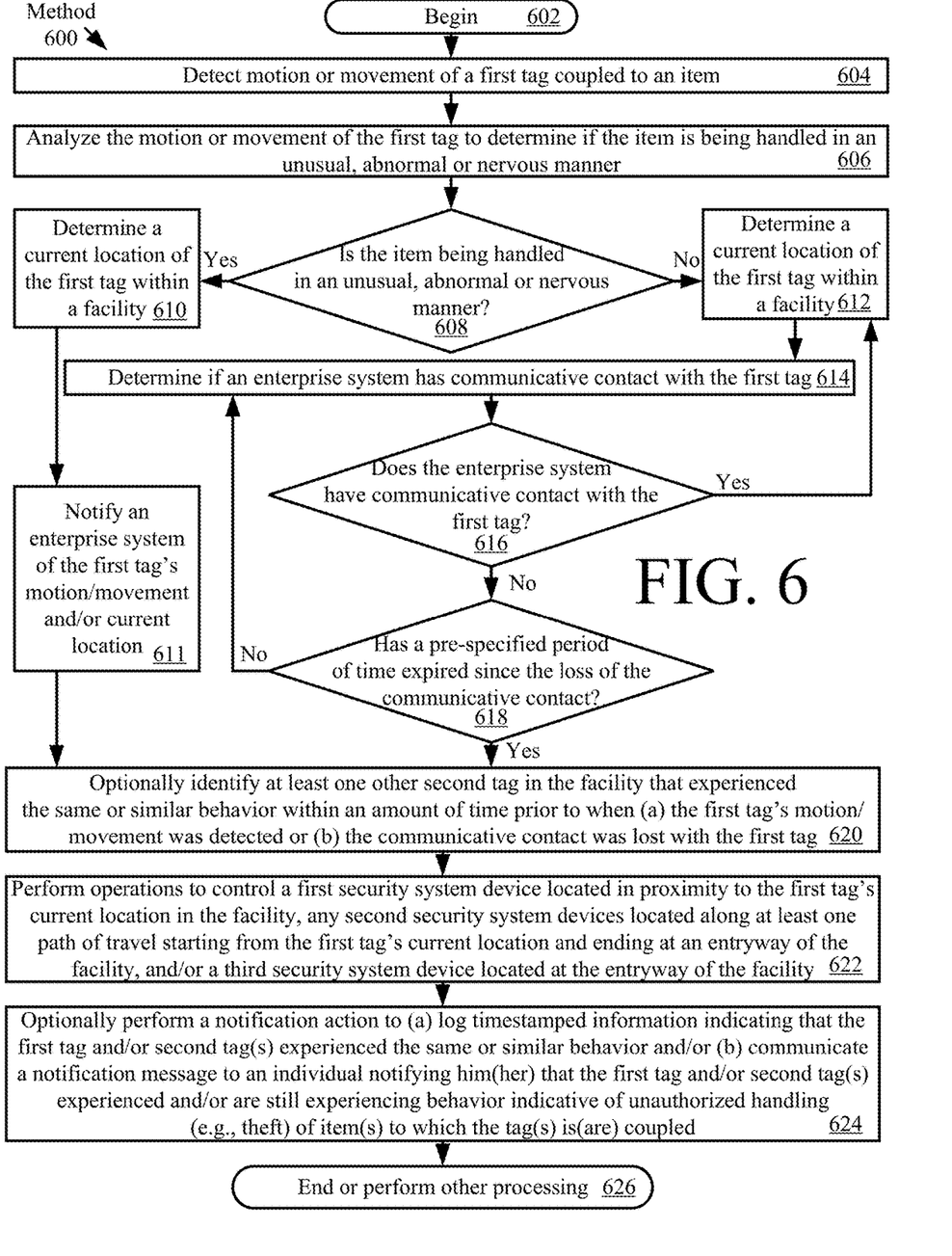
FIG. 6 is a flow diagram of an illustrative method for controlling at least one security device based on the behavior of at least one tag.

Referring now to FIG. 6, there is provided a flow diagram of an exemplary method 600 for controlling one or more security devices based on the behavior of one or more tags (e.g., EST 120 of FIG. 1 and/or EST 200 of FIGS. 2-4). Method 600 comprises operations performed in blocks 602-626. The present solution is not limited to the particular order in which the operations of blocks 602-626 are performed in FIG. 6. The location of one or more of the blocks of FIG. 6 can be changed. For example, the operations of 610 and 612 can be performed prior to 604 or immediately after 604.

As shown in FIG. 6, method 600 begins with 604 and continues with 606 where motion or movement of a tag (e.g., EST 120 of FIG. 1 and/or EST 200 of FIGS. 2-4) is detected. This detection is made by the tag's controller (e.g., controller 310 of FIG. 3) using sensor data generated by local sensors thereof (e.g., sensors 350 of FIG. 3). The detected motion/movement is analyzed in 606 to determine if the item (e.g., item 118 of FIG. 1) is being handled in an unusual, abnormal or nervous manner. This analysis is performed by the tag's controller using pre-specified reference motion/movement patterns for tags. In some scenarios, each reference motion/movement pattern is representative of a certain type of behavior indicative of a possible theft or unauthorized use of the item to which the tag is coupled. The reference motion/movement patterns are stored in a local memory (e.g., memory 308 of FIG. 3) of the tag (e.g., as part of information 324 of FIG. 3). A motion/movement pattern defined by the sensor data is compared to each of the reference motion/movement patterns to determine if a match exists therebetween by a certain percentage (e.g., ≥50%).

If a determination is made based on the analysis of 606 that the item is being handled in an unusual, abnormal or nervous manner [608:YES], then 610 is performed where a current location of the tag is determined. The tag's internal location module (e.g., location module 330 of FIG. 3) is used to make this determination of 610. The tag's internal location module implements any known or to be known technique for determining an object's location in a facility. The tag then communicates with an enterprise system (e.g., access point 128 and/or computing device 112 of FIG. 1) to notify the same of the first tag's motion/movement and/or current location, as shown by 611. Next, method 600 continues with 620-626 which will be described below.

In contrast, if a determination is made based on the analysis of 606 that the item is not being handled in an unusual, abnormal or nervous manner [608:NO], then 612 is performed where a current location of the tag is determined. 612 can also involve performing operations by the tag to communicate with the enterprise system to notify the same of the first tag's motion/movement and/or current location.

Next in 614, operations are performed to determine if the enterprise system has communicative contact with the first tag. For example, an RFID reader (e.g., RFID reader 134 of FIG. 1) of the enterprise system (with a coverage area inclusive of the tag's current location) interrogates the first tag and waits for a response signal from the first tag. If the response signal is not received by the RFID reader within a given period of time, then a conclusion is made that the communicative contact has been lost between the enterprise system and the first tag. In contrast, if the response signal is received by the RFID reader within a given period of time, then a conclusion is made that the communicative contact has not been lost between the enterprise system and the first tag. The present solution is not limited to the particulars of this example.

If the enterprise system does have communicative contact with the first tag [616:YES], then method 600 returns to 612. In contrast, if the enterprise system has lost communicative contact with the first tag [616:NO], then method 600 continues with 618 where a decision is made as to whether or not a pre-specified period of time has expired since the loss of the communicative contact. If not [618:NO], method 600 returns to 614. If so [618:YES], then method 600 continues with 620-624.

620 involves optionally identifying at least one other second tag in the facility that experienced the same or similar behavior within an amount of time prior to when (a) the first tag's motion/movement was detected or (b) the communicative contact was lost with the first tag. This identification can be achieved by the enterprise system (e.g., computing device 112 of FIG. 1) through an analysis of timestamped data stored in a datastore (e.g., database 114 of FIG. 1). The timestamped data specifies the behavior of a plurality of second tags, as well as includes unique identifiers for the second tags. The enterprise system retrieves the unique identifiers for those second tag's which experienced the same or similar behavior as the first tag within the given amount of time.

622 involves performing operations by the enterprise system to control a first security system device located in proximity to the first tag's current location in the facility, any second security system devices located along at least one path of travel starting from the first tag's current location and ending at an entryway of the facility, and/or a third security system device located at the entryway of the facility. An electronic map of the facility can be used in 622 to identify the security system devices (e.g., security device(s) 132 of FIG. 1) which (a) are located in proximity to the first tag's current location in the facility, (b) are located along at least one path of travel starting from the first tag's current location and ending at an entryway of the facility, and/or (c) are located at the entryway of the facility. Techniques for generating such electronic maps are well known in the art, and therefore will not be described herein. Also, techniques for determining an object's path of travel through a facility are well known in the art, and therefore will not be described herein. Any known or to be known technique for (A) generating an electronic map and/or (B) determining an object's path of travel through a facility can be used herein without limitation.

The security system device can include, but is not limited to, motion sensors (interior and/or exterior), door sensors, door locks (e.g., remotely controlled electro-mechanical latch mechanism), window sensors, window locks (e.g., remotely controlled electro-mechanical latch mechanism), window shades (e.g., remotely controlled electron-mechanical motorized shade), security cameras (e.g., still image cameras and/or video cameras), microphones, sirens, alarms, and/or pedestals. The security system device can be controlled to transition operational states (e.g., from a sleep state to an audio and/or video capture state, from an unlocked state to a locked state, or from an silent state to a siren/alarm output state, etc.), change a pointing direction (e.g., via camera panning), change a pointing angle, and/or change a zoom level. Techniques for controlling electronic devices and electro-mechanical devices are well known in the art, and therefore will not be described in detail herein. Any known or to be known technique for controlling an electronic device and electro-mechanical device can be used herein without limitation.

624 involves optionally performing a notification action to (a) log timestamped information indicating that the first tag and/or second tag(s) experienced the same or similar behavior and/or (b) communicate a notification message to an individual notifying him(her) that the first tag and/or second tag(s) experienced and/or are still experiencing behavior indicative of unauthorized handling (e.g., theft) of item(s) to which the tag(s) is(are) coupled. The timestamped information can be written to a log file stored in a remote datastore (e.g., database 114 of FIG. 1). The individual can be dispatched to the tag's last known location or to a particular area or entryway of the facility in response to the notification message. Subsequently, 626 is performed where method 600 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for controlling a security device, comprising:
   detecting a first behavior of a first tag;
   determining if the first behavior of the first tag is the same as or similar to a second behavior of a second tag;
   controlling operations of the security device based on results of the determining; and
   logging timestamped information indicating that the first and second tags experienced the same or similar behavior.

2. A tag, comprising:
   at least one sensor configured to generate sensor data indicating a first behavior of the tag; and
   a processor configured to analyze the sensor data to determine if the first behavior of the tag is the same as or similar to a second behavior of another tag, cause operations of a security device to be controlled based on results of the determining, and log timestamped information indicating that the first and second tags experienced the same or similar to a second behavior.

3. The method of claim 1, wherein:
   the security device (i) is external to the first and second tags, (ii) is of a type different than a tag, and (iii) facilitates a monitoring or physical securement of a facility or a given area within the facility.

4. The method according to claim 3, wherein the first behavior is detected based on sensor data generated by at least one sensor disposed in the first tag.

5. The method according to claim 4, wherein the first behavior is detected by analyzing the sensor data to determine if the first tag is being handled in an unusual, abnormal or nervous manner.

6. The method according to claim 5, wherein the sensor data is analyzed by the first tag's processor and involves comparing a movement pattern defined by the sensor data to each of a plurality of reference movement patterns.

7. The method according to claim 6, wherein each said reference movement pattern represents a certain type of behavior indicative of a possible theft or unauthorized use of the item to which the first tag is coupled.

8. The method according to claim 5, further comprising determining a current location of the first tag in response to a determination that the first tag is being handled in an unusual, abnormal or nervous manner.

9. The method, according to claim 8, wherein the security device's operations are further controlled based on the first tag's current location.

10. The method according to claim 8, wherein the security device is located (a) in proximity to the first tag's current location, (b) along at least one path of travel starting from the first tag's current location, or (c) at an entryway of a facility.

11. The method according to claim 3, wherein the security device comprises a motion sensor, a door sensor, a door lock, a window sensor, a window lock, a window shade, a security camera, a microphone, a siren, an alarm or a pedestal.

12. The tag of claim 2, wherein the security device (i) is external to the first and second tags, (ii) is of a type different than a tag, and (iii) facilitates a monitoring or physical securement of a facility or a given area within the facility.

13. The tag according to claim 2, wherein the first behavior is detected by analyzing sensor data to determine if the tag is being handled in an unusual, abnormal or nervous manner.

14. The tag according to claim 13, wherein the analyzing involves comparing a movement pattern defined by the sensor data to each of a plurality of reference movement patterns.

15. The tag according to claim 14, wherein each said reference movement pattern represents a certain type of behavior indicative of a possible theft or unauthorized use of the item to which the tag is coupled.

16. The tag according to claim 13, wherein the processes further determines a current location of the tag in response to a determination that the tag is being handled in an unusual, abnormal or nervous manner.

17. The tag according to claim 16, wherein the operational state or mechanical state variable of the security device is changed further based on the first tag's current location.

18. The tag according to claim 17, wherein the security device is located (a) in proximity to the first tag's current location, (b) along at least one path of travel starting from the first tag's current location, or (c) at an entryway of a facility.

19. The tag according to claim 2, wherein the security device comprises a motion sensor, a door sensor, a door lock, a window sensor, a window lock, a window shade, a security camera, a microphone, a siren, an alarm or a pedestal.

20. The tag according, to claim 2, wherein the processor is further configured to cause, a notification message to be provided to an individual that the tag is being handled in the same as or similar to a second behavior of another tag.

* * * * *